Figures 1, 2, 3:
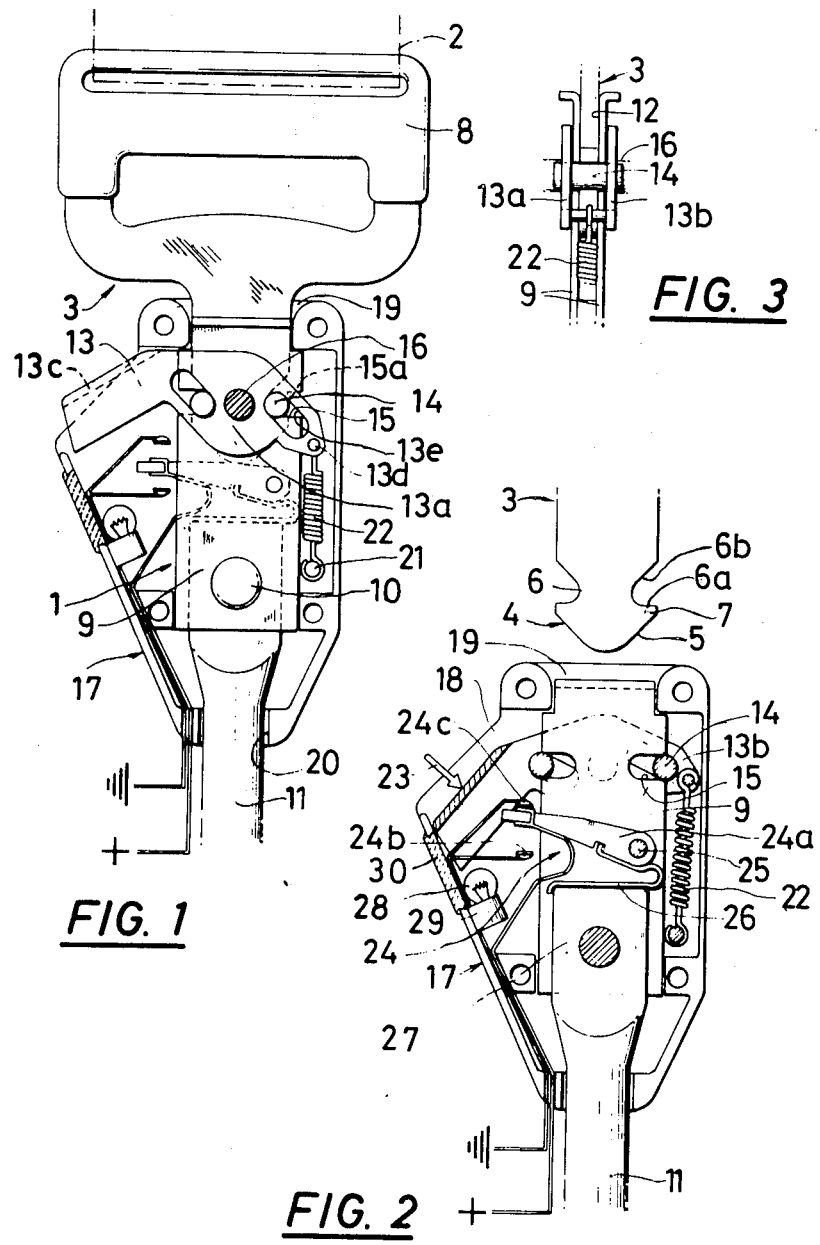

United States Patent [19]

Lindblad

[11] 4,047,267
[45] Sept. 13, 1977

[54] DEVICE IN CONNECTION WITH LOCKS FOR SAFETY BELTS

[76] Inventor: Oskar Lennart Lindblad, Hedasgatan, 16, Vargarda, Sweden

[21] Appl. No.: 688,767

[22] Filed: May 21, 1976

Related U.S. Application Data

[63] Continuation of Ser. No. 533,795, Dec. 18, 1974, abandoned.

[30] Foreign Application Priority Data

Dec. 27, 1973 Sweden .................................. 7317454
Dec. 27, 1973 Sweden .................................. 7317453

[51] Int. Cl.² ...................... A44B 19/00; A62B 35/02; B60R 21/10
[52] U.S. Cl. ............................ 24/230 AL; 24/230 A; 24/230 R; 180/82 C; 200/61.58 B; 280/744; 297/385
[58] Field of Search ............. 180/82 C; 280/744; 24/230 AL, 230 AN, 230 R, 211 K, 211 R, 230 AV; 297/385; 279/1 B, 66, 119

[56] References Cited

U.S. PATENT DOCUMENTS

| 2,604,557 | 7/1952 | Nelson | 200/61.59 |
| 2,831,959 | 4/1958 | Jefferson | 200/61.59 X |
| 3,146,846 | 9/1964 | Gutshall | 180/82 C |
| 3,494,664 | 2/1970 | States | 297/385 X |
| 3,514,821 | 6/1970 | Saxmark | 24/230 AV |
| 3,597,811 | 8/1971 | Cunningham | 24/230 AV |
| 3,692,262 | 9/1972 | Gaylord | 24/280 AV X |
| 3,840,849 | 10/1974 | Lohr | 180/82 C X |
| 3,871,090 | 3/1975 | Romanzi | 24/230 AV |
| 3,920,265 | 11/1975 | Nilsson | 280/744 |

FOREIGN PATENT DOCUMENTS

| 575,538 | 5/1959 | Canada | 24/230 AN |

Primary Examiner—John P. Silverstrim
Attorney, Agent, or Firm—Ulle C. Linton

[57] ABSTRACT

A vehicle safety belt connector has a tonque-shaped male member attached to the safety belt and having a notch in an edge thereof and a female member attachable to the vehicle. The female member has a pair of flat parallel walls with locking of the male member to the female member being effected by means of a pair of pins transversely movable in opposed slots extending inwards from the edges of the flat walls so that each of the pins, in their inner positions, engages one of the notches. A manually operable cam member serves to operate the pins.

1 Claim, 3 Drawing Figures

U.S. Patent  Sept. 13, 1977  4,047,267

DEVICE IN CONNECTION WITH LOCKS FOR SAFETY BELTS

This is a continuation of application Ser. No. 533,795, filed Dec. 18, 1974, now abandoned.

The present invention relates to a device in connection with such locks for safety belts for vehicles as comprise a locking socket rigidly connected with the chassis or similar of the vehicle and a preferably tongue shaped insertion part connected with the band of the belt assembly and designed with an engaging portion which insertion part can be introduced into the socket and is made in such a way that it thereby displaces locking organs arranged in the locking socket and is snapped into a locking position actuated by the locking means, which can be disengaged by means of a movable operating device.

It is an object of the present invention to provide a safety belt lock, whch is reliable in use and among other things does not permit the insertion part to be retained in any unstable intermediate position, and which further is simple to operate, simple as to its design and consequently cheap to manufacture.

The above mentioned objects are obtained by means of the device according to the present invention, which is characterized by the locking means comprising for one thing one or several pins extending across the direction of insertion of the insertion part, which pins are movable in locking slits extending across the direction of insertion of the pins and the longitudinal direction of said pins, said slits being made in guiding walls for the insertion part, and for another thing guiding slits arranged in the operating device and extending in a direction forming an oblique angle to the direction of the locking slits, in which guiding slits the pins are arranged permitting them to be displaced at the same time as the movement of the cooperating device takes place in cooperation with a springing means coupled thereto.

The invention will now be described more in detail in connection with an example of an embodiment thereof and with reference to the accompanying drawing, in which FIG. 1 is a side elevational view of the safety belt lock according to the invention, part of the surrounding casing being removed for clarity's sake, the lock being in its locking position, FIG. 2 is a view corresponding the view in FIG. 1, but with the lock in a disengaging cycle, and FIG. 3 shows part of the lock as seen from the right in FIG. 1.

As is evident from FIGS. 1 and 2 the safetybelt lock according to the invention substantially comprises a locking socket 1, which is rigidly connected with the chassis of the vehicle, and an insertion part 3 connected with the band 2 of the safety belt. This insertion part in the example illustrated substantially exhibits a tongue shape and is provided with an insertion portion 4, which at its end is shaped with two oblique guiding edges 5 and two indentations 6 adjoining said edges, which results in a pointed portion 7 being shaped between the respective guiding edge and indentation. The insertion part 3 is further provided with a chape 8, through which the band 2 of the safety belt is arranged to slide.

As is evident from the FIGS. 1, 2 and 3, the locking socket 1 substantially comprises two plates 9 in parallel arrangement, which plates by means of a rivet 10 is attached to a bar 11 connected with the chassis of the vehicle. A slotlike space 12 is shaped between the plates 9, into which the insertion part 3 is designed to be inserted. In order to keep the insertion part in a locking position in the locking socket, locking organs are provided, which can be disengaged from the locking position by means of an operating device 13. The locking organs comprise two pins 14 extending across the direction of insertion of the insertion part 3, said pins being movable sidewise in four locking slits 15, arranged as opposed pairs, which slits are taken out in the plates 9. The operating device comprises, a flipping arm 13, which is gable shaped with two legs 13, 13b extending in parallel direction to the plates 9 at each side of them. The two legs of the flipping arm are in between them connected by means of a pressure plate 13c. The flipping arm 13 is further pivotable around pivot pins 16, which are placed at the inside of a casing 17 surrounding the locking socket 1, which casing is provided with an opening 18 for the pressure plate 13c, and insertion opening 19 for the insertion part 3, and an opening 20, through which the bar 11 extends. Between a projection 21 of the inside of the casing and the end 13d of the flipping arm occupying an opposite position relative to the pressure plate 13 a tension spring 22 is mounted. Two guiding slits 13e are provided in each one of the legs 13a, 13b of the flipping arm said slits 13e extending in a direction forming an angle to the direction of the locking slits 15 and cutting the path of said slits 15 in such a way that the pins 14 extend through the locking slits as well as through the guiding slits.

According to the invention the safety belt lock is provided with a contact means 24 incorporated into the casing 17, said means comprising a movable contact organ 24a and an outer and an inner fixed contact element 24c, 24b respectively. The movable contact organ 24a is pivotable round a pivot pin 25 and is biased by a plate spring 26 in such a manner that the movable contact organ in a non-actuated position tends to lie against the outer fixed contact element 24c. For clarity's sake one of the plates 9 has been removed in FIG. 2, from which it is evident that the movable contact organ 24a is located between the plates with the plate spring 26 bearing against the upper flattened end portion 27 of the bar 11. The contact means 24 together with an incandescent lamp 28 and a source of current, which for example can be the storage battery of the vehicle, form part of an electric circuit. In this connection the two fixed contact elements 24b, 24c are in between them electrically connected and coupled in series with the incandescent lamp 28, which in its turn is connected to the grounded pole of the storage battery of the vehicle, by way of example via the chassis of the vehicle. The movable contact element 24a is electrically connected with the opposed pole of the storage battery of the vehicle, i.e. the positive pole. The incandescent lamp 28 is inserted in a socket 29 on the inside of the casing 17, which is provided with a transparent window 30 right in front of the incandescent lamp.

Thus, when the safety belt is going to be fastened and locked by means of the safety belt lock according to the invention, the insertion part 3 and the locking socket 1 are separated from one another, the flipping arm 13 and the pins 14 being in the position illustrated in FIG. 1 because of the bias of the tension spring 22, in which situation the contact means 24 with the movable contact organ 24a is in the position illustrated in FIG. 2, i.e. lying against the outer fixed contact element 24c and consequently closing he electric circuit. The incandescent lamp 28 therefore is emitting light, when the insertion part 3 is outside the locking socket 1 and the safety belt consequently not fastened. When the belt shall be fastened, the incandescent lamp 28 thus emits light through the lid 30 and/or the pressure plate 13 c, suitably designed as a window, and gives an indication to the driver of the vehicle as to the position of the locking socket 1, so that the insertion part 3 in a simple and rapid manner can be inserted without the person in question having to grope around with the insertion part, which otherwise may be a time consuming matter, especially in case of darkness.

When the insertion part 3 is introduced through the insertion opening 19 of the locking socket 1, the pins 14 are displaced in the guiding slits 15 in outwards direction from the center point of the locking socket, this performance being brought about by the arrow pointed engaging portion 4 with its oblique guiding edges 5 pressing apart the pins. During the guided displacement of the pins 14 in the locking slits 15 the flipping arm 13 against the bias of its spring 22 is pivoted from the position illustrated in FIG. 1 to the position shown in FIG. 2 by the simultaneous displacement of the pins in the oblique guiding slits 13e. When the engaging portion 4 of the insertion part 3 with its pointed portions 7 has passed the pins 14 and the indentations 6 located above them arrive level with the pins 14, said pins are brought into the indentations by the flipping arm 13 again performing a pivoting movement under the bias of the tension spring 22 from the position illustrated in FIG. 2 to th position shown in FIG. 1, whereby the guiding slits 13e on account of their oblique position relative to the locking slits 15 actively bring about the return of the pins to their starting position, which is a locking position for the insertion part 3. The stable locking position is thus brought about by the engagement of the pins 14 for one thing of the locking slits 15 of the locking socket 1 and for another thing of the indentations 6 in the engaging portion 4 of the insertion part 3, whereby a tensile stress appearing in the longitudinal direction of the lock is absorbed in the insertion part 3 by the pressing of the pins 14 against a shoulder 6a of the indentations 6 and in the locking socket 1 by the pins 14 being pressed against the upper edge portion 15a of the locking slits 15.

When the insertion part 3 is being introduced into the above described locking position the movable contact element 24a of the contact means 24 will be pressed down by the arrow-shaped engagement portion 4 of the insertion part 3 to the position which is shown in FIG. 1 against the bias of the plate spring 26. Thereby the electrical connection between the outer fixed contact element 24c and the movable contact element 24a becomes broken, whereby the lamp 28 is being switched off and the movable contact element occupies a position between the both fixed contact elements 24b, 24c as shown in FIG. 1.

As can be seen in FIG. 2 the both indentations 6 have an inclined rear edge portion 6b, whereby a little retrograding movement is made possible when the insertion part is being pressed down. Hereby the movable contact element 24a will be pressed down from the intermediate position which is shown in FIG. 1 into contact engagement with the inner fixed contact element 24b, whereby the electrical circuit will be temporary closed. This manual extra possibility for closing the circuit is mainly intended for such retractor belts which are locked in a certain adjustment position of the belt band by means of an electrically actuated locking device which will be released by pressing down the insertion part and thereby closing the circuit.

When the insertion part 3 is going to be released from the locking position illustrated in FIG. 1 the pressure plate13c, by means of a light downwards pressure is brought in the direction of the arrow 23 in FIG. 2, whereby the flipping arm again is pivoted against bias of the tension spring 22, and the pins 14 by means of the guiding slits 13e are brought out of engagement with the indentations 6 of the insertion part 3 and into the position illustrated in FIG. 2, whereby the insertion part is set free and can be brought out of the locking socket 1. Hereby the movable contact element 24a moves back from the position which is shown in FIG. 1 to the intermediate position which is shown in FIG. 2.

The invention is not limited to the example of embodiment described above and illustrated in the drawings, but can be varied within the scope of the subsequent claims. Thus, by way of example one can imagine that the lock is of the single-acting type with only one pin and one indentation in the insertion part, the flipping arm 13 being provided with only two instead of four guiding slits 13e and each one of the plates 9 being provided with one locking slit 15. Further, one can imagine that the operating device instead of a pivotable flipping arm 13 comprises by way of example a sleeve, which is displaceable in the insertion direction against bias of a spring and provided with oblique guiding slits. Moreover the contact elements 24a, 24b, 24c can be given a different location than the one illustrated in the drawing, the movable contact organ 14a being actuated in another manner. The inner fixed contact organ 24b can be omitted in connection with such safety belts, as are not provided with electromagnetically operated roller-locks. Further the incandescent lamp illustrated in the drawing can be connected in parallel to an indicating organ of optical or acoustic type, for example an operating lamp or a buzzer, said organ being mounted on the instrument board of the vehicle.

What we claim is:
1. A connector comprising a male tongue-shaped member, a female member having a pair of flat sidewalls, and means for releasably locking said male and female members to each other, said means comprising
   a pair of opposed transverse slots in each of said side walls, said slots in one side wall registering with said slots in the other side wall,
   a pair of pins each of which is guided by one of said slots in one side wall and the registering slot in the other side wall for transverse movement in said slots,
   a pair of notches provided in the edges of said tongue-shaped member, each of said notches having a width sufficient to accommodate one of said pins, the edge of each of the notches nearest to the tip of said tongue-shaped member extending at right angles to the longitudinal axis of said tongue-shaped member,
   a manually operable cam member for shifting said pins between an inner position in which said pins engage said notches and an outer position outside said notches, said cam member having a pair of opposed flat shanks each of which has a pair of camming slots engaging end portions of said pair of pins,
   spring means urging said cam member towards a position in which said pins occupy their inner positions, and
   said cam member being a lever pivotable about an axis extending at right angles to said parallel side walls between the inner ends of said opposed slots therein.

* * * * *